United States Patent
Egashira

(10) Patent No.: US 7,137,718 B2
(45) Date of Patent: Nov. 21, 2006

(54) AUTOMOTIVE LAMP

(75) Inventor: Ken Egashira, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 77 days.

(21) Appl. No.: 10/492,661

(22) PCT Filed: Oct. 31, 2002

(86) PCT No.: PCT/US02/34911

§ 371 (c)(1), (2), (4) Date: Apr. 15, 2004

(87) PCT Pub. No.: WO03/038335

PCT Pub. Date: May 8, 2003

(65) Prior Publication Data

US 2004/0218400 A1 Nov. 4, 2004

(30) Foreign Application Priority Data

Oct. 31, 2001 (JP) .............................. 2001-334669
Nov. 5, 2001 (JP) .............................. 2001-339359

(51) Int. Cl.
F21V 9/14 (2006.01)
(52) U.S. Cl. ........................................ 362/19; 362/509
(58) Field of Classification Search ................ 362/19, 362/509, 510, 539, 520
See application file for complete search history.

(56) References Cited

U.S. PATENT DOCUMENTS

| | | | |
|---|---|---|---|
| 2,252,324 A * | 8/1941 | Land ........................... | 313/111 |
| 2,748,659 A * | 6/1956 | Geffcken et al. ........... | 359/487 |
| 2,887,566 A * | 5/1959 | Marks ......................... | 362/19 |
| 3,513,305 A * | 5/1970 | Joncas ......................... | 362/19 |
| 4,128,864 A * | 12/1978 | Brussee et al. ............. | 362/520 |
| 4,153,928 A * | 5/1979 | Speedy ........................ | 362/521 |
| 4,912,606 A | 3/1990 | Yamamoto | |
| 5,001,610 A | 3/1991 | Otaka | |
| 5,448,454 A | 9/1995 | Nonaka | |
| 5,571,277 A | 11/1996 | Allred et al. | |
| 5,931,566 A | 8/1999 | Fraizer | |
| 6,074,079 A * | 6/2000 | Yanagihara et al. ........ | 362/509 |
| 6,409,368 B1 | 6/2002 | Henneboehle et al. | |
| 6,883,938 B1 * | 4/2005 | Kohara et al. .............. | 362/296 |
| 6,906,863 B1 | 6/2005 | Yoshida et al. | |
| 2001/0046140 A1 * | 11/2001 | Chase et al. ................ | 362/549 |

FOREIGN PATENT DOCUMENTS

| | | |
|---|---|---|
| DE | 198 25 269 | 12/1999 |
| DE | 198 25 269 A1 | 12/1999 |
| EP | 1 142 693 | 10/2001 |
| JP | 5-6510 | 1/1993 |
| JP | 5-290606 | 11/1993 |
| JP | 10-228812 | 8/1998 |
| JP | 11-66906 | 3/1999 |

* cited by examiner

Primary Examiner—Renee Luebke
Assistant Examiner—Gunyoung T. Lee
(74) Attorney, Agent, or Firm—Harold C. Knecht, III

(57) ABSTRACT

A vehicle lamp includes a lamp chamber containing at least one light source in an interior thereof and having a light-emitting opening, a lamp cover is attached to the light-emitting opening, and a polarizing film is applied to an inner surface of said cover body. The lamp cover includes a transparent cover body having a configuration and size capable of covering at least a light emission surface of the lamp. The polarizing film has fine textured structures on a surface thereof for changing color of the exterior of the lamp when the lamp is in a lit condition compared to an unlit condition.

26 Claims, 6 Drawing Sheets

AUTOMOTIVE LAMP

FIELD OF THE INVENTION

The present invention relates to an automotive lamp, in particular to an automotive lamp with the appearance design quality thereof further improved by changing the view of the lamp chamber, and more particularly to an automotive lamp which is capable of changing its appearance between lit conditions and unlit conditions (i.e., when the lamp is on and when it is off), thereby achieving a novel and high quality appearance and design. The automotive lamp of the present invention may be advantageously used as a rear combination lamp of an automobile (e.g., a passenger car).

BACKGROUND

In recent years, the automotive lamp has been required to exhibit an improved appearance of the lamp chamber both when lit and unlit (i.e., when the lamp is on and off), as well as the original function as the lighting means. Among improvements of appearance, one of the biggest problems is an improvement of lamp color, that is, a hue exhibited by a lamp when observed from outside. For example, if a turn signal lamp (direction indicator) has its lamp cover (also called outer cover or lens) colored in yellow so as to emit yellow light (actually, amber color that is between yellow and orange, but called yellow for convenience) upon lighting, it is viewed and recognized as yellow not only under lit conditions but also under unlit conditions, and this may impair sense of unity and harmony depending upon the type or color of the vehicle. The problem of lamp color may become more complicated in the case of a rear combination lamp in which plural lamps are used in combination. For example, when a red stop and tail lamp (brake light, tail light), a yellow direction indicator and a colorless backup lamp (reversing light) are coexistent, it is always a problem how to achieve sense of unity and harmony in the color of lamp.

Although numerous attempts have been previously made to improve the sense of unity and harmony in lamp color, fully satisfactory result or practical success has not yet been obtained. For example, a method in which a colorless lamp cover is used and a yellow or red cap is attached to cover a light source in a lamp chamber, has been widely implemented. This method aims to obtain uniform colorless appearance under unlit conditions with differently colored light-emitting portions in a rear combination lamp. However, under unlit conditions, the color of a cap can be recognized through the lamp cover.

An automotive lamp is disclosed in Japanese Utility Model Registration Application No. 5-6510, in which, in order to mask the color of a colored cap under unlit conditions, a sheet having selective light transmissivity (semi-transparent mirror) is disposed between the colored cap and a lamp cover. However, this method has a serious disadvantage that light transmittance under lit conditions is also lowered. This method has another disadvantage that, for attachment of the semi-transparent mirror, manufacturing process becomes complicated, leading to increased cost.

Japanese Unexamined Patent Publication (Kokai) No. 5-290606 discloses a rear combination lamp in which light emitting surfaces of red, yellow and white are provided on an integrated lamp body, wherein a red inner lens is provided on the red light emitting surface, a yellow inner lens is provided on the yellow light emitting surface and a yellow green inner lens is provided on the white light emitting surface, while an outer lens of single red color covers each light emitting surface to obtain an integrated sense of a lens surface. With this method, however, unified appearance can be obtained only in red color under unlit conditions, and moreover, the outer lens is only faintly colored so that, undesirably, inner lenses disposed inside can be viewed and recognized. Thus, this method is unsatisfactory in the sense of unity. Further, with this method, manufacturing process is complicated for disposition of inner lenses, again leading to increase of cost.

Further, Japanese Unexamined Patent Publication (Kokai) No. 10-228812 discloses a lighting fixture for a vehicle comprising a housing, a bulb, a transparent colored cap covering the bulb, an inner lens with prism surface covering the cap, and an outer lens installed in the opening of the housing, wherein step-shaped parts are further formed on both front and back surfaces of a portion of the inner lens. With this method, however, manufacturing process is complicated due to complex construction of the lamp chamber and special processing of the inner lens, leading to increase of cost. Moreover, because the inner lens has a complex curved surface and prism pattern is coarse, the amber color of the cap is recognizable to some degree under unlit conditions, and this method has also a drawback that sense of unity is inadequate.

Another method that has been employed to improve the external appearance of the lamp chamber is a method in which the lamp cover is provided with a surface portion formed as a lens alternating with a surface portion not formed as a lens, so that the inner wall of the housing in the depth of the lamp chamber is visible through the surface portion not formed as a lens while the surface portion formed as a lens is recognizable mainly as its own surface, with the result that the feeling of the depth of the lamp chamber can be emphasized. In this method, however, the lamp cover is formed by injection molding, and therefore the lens pattern is so rough (with a pitch as large as one to several mm) that the pitches are seen as an eyesore.

Also, in order to improve the visibility of the rear turn signal lamps mounted at the corners of the vehicle body, a prismatic lens is often mounted on the cover surface. This improves only the functions but cannot improve the appearance. Further, the prismatic lens being formed by injection molding of a resin has a rough lens pattern and the pitches offend the eye.

SUMMARY OF THE INVENTION

It is therefore an object of the present invention to solve one or more problems in the art. For example, it can be an object of the present invention to provide an automotive lamp which, under unlit conditions, can achieve harmonized and uniform appearance with a color of the automobile body or other parts or windows, in addition to satisfactorily function as a lamp under lit conditions.

It can be another object of the present invention to provide an automotive lamp which is simple in construction and can be easily manufactured at low cost.

It can also be an object of the present invention to provide an automotive lamp which can fully exhibit the function as a lamp when lit, can achieve the highest ever design quality of the external appearance and makes it possible to observe a uniform external appearance of high quality with emphasis placed on the feeling of depth when the lamp is turned off.

It can be an additional object of the present invention to provide an automotive lamp which can be completed simply by improving the existing lamp in simplistic fashion on the one hand and which can easily realize many variations of appearance, if required, on the other hand.

In one aspect of the present invention, an automotive lamp is provided with a lamp chamber containing at least one light source in an interior and having a light emitting opening. The light emitting opening of the lamp chamber has attached thereto a lamp cover which comprises a transparent cover body having a configuration and size capable of covering at least a light emission surface of the lamp and a polarizing film applied to an inner surface of the cover body. The polarizing film has fine textured structures on a surface thereof. The polarizing film can be a prismatic-structured film, with the fine textured structures being prismatic structures.

In another aspect of the present invention, an automotive lamp is provided that comprises a lamp chamber with at least a light source arranged therein and having a light-emitting opening. A transparent lamp cover of the shape and size covering at least the light-emitting surface of the lamp is mounted on the light-emitting opening of the lamp chamber, and the inner surface of the lamp cover includes a selective polarizing layer formed with, in a predetermined pattern, structure portions having a finely textured structural surface and non-structure portions not having such a finely textured structural surface. The polarizing layer can be a prismatic-structured layer and the finely textured structural surface can comprise prismatic structures.

In the automotive lamp according to this invention, the selective polarizing layer can be formed on the inner surface of the lamp cover in any of various forms as described in detail below. The inner surface of the lamp cover, for example, can be formed with a selective polarizing layer by partially attaching thereto or arranging along the inner surface a polarizing film having a textural structural surface corresponding to the structure portions having a finely textured structural surface. As another method of forming a selective polarizing layer, a polarizing film having patterns of the structure portions having a finely textured structural surface and non-structure portions not having such a finely textured structural surface is prepared, and attached to or arranged along the inner surface of the lamp cover. As another alternative method of forming a selective polarizing layer, the inner surface of the lamp cover is machined directly in such a manner that the patterns of the structure portions and the non-structure portions are formed on or transferred to the inner surface of the lamp cover.

DETAILED DESCRIPTION

Figure 1:
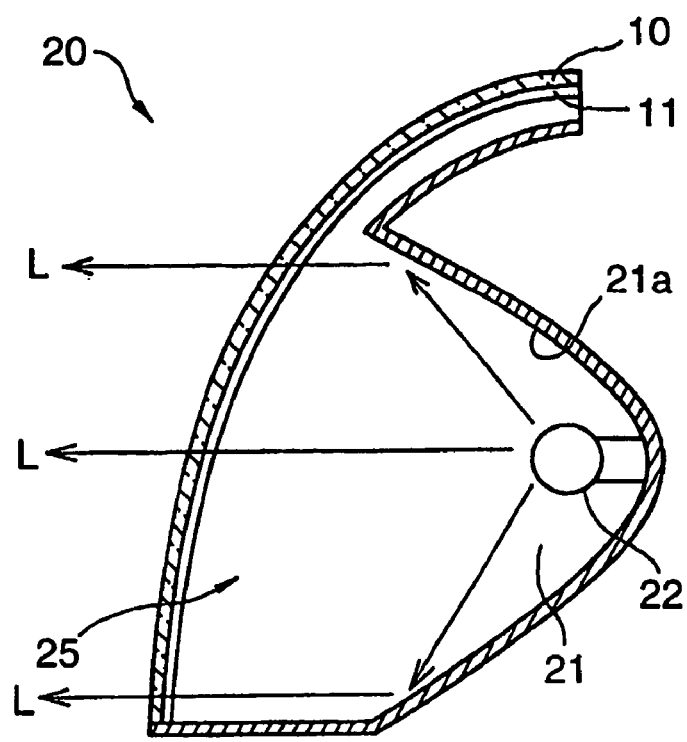
FIG. 1 is a cross-sectional view illustrating a constitutional example of the automotive lamp according to the present invention.

The present automotive lamp includes a lamp body using a polarizing film or layer provided on the lamp cover at a light emission surface of the automotive lamp. In the lamp of the present invention, by using a polarizing film that exhibits special optical characteristics derived from fine textured structures of the surface, the color can be varied between the light emitted under lit conditions and the appearance under unlit conditions, so that a novel and high quality appearance and design can be realized.

The automotive lamp of the present invention can be used in various vehicles for lighting or signaling purposes. Suitable vehicles include, but are not limited to, automobiles (including RVs, passenger cars, campers, etc.), buses, trucks, etc. An automobile, like a passenger car, is most suitable since the external appearance design quality can be improved. Further, the automotive lamp of the present invention may have other forms. Specifically, the lamp is not necessarily configured of a single lamp chamber but may have a plurality of lamp chambers (combination lamp). In some cases, the automotive lamp according to the invention may use a planar light-emitting element as a light source integrated with the lamp cover as a thin lamp structure, instead of the structure with the lamp chamber having a light source.

The automotive lamp of the present invention will be described in a construction that has a light source in the lamp chamber. The lamp chamber has at least a light source arranged therein. The lamp may comprise at least two lamp chambers each having a light source of suitable luminance disposed therein. In some cases, two or more light sources may be disposed in one lamp chamber. The inner wall of the lamp chamber may have structure such as a concave mirror for collimating light from the light source, or it may comprise, separate from the inner wall, a concave mirror or similar light reflecting means as a reflector.

In the automotive lamp of the present invention, if it is in the form of a combination lamp, respective lamp chambers are preferably disposed adjoining to and associated with each other. Specifically, the lamp chambers, though not limited to those listed below, can include a red stop lamp doubling as a tail lamp, an amber turn signal lamp, a colorless back-up lamp, etc. If required, a fog lamp, a clearance lamp or the like may be incorporated in the automotive lamp.

In the case where a combination lamp having at least two lamps combined is employed as the automotive lamp according to the invention, the lamp chambers may be identical or different in shape and size. In the lamp, the combination of the lamp chambers can be changed in arbitrary manner. In order to improve especially the visibility and design quality and realize the feeling of integrity with the vehicle body at the same time, however, the lamp chambers are preferably arranged substantially linearly vertically or horizontally or collectively in a block. If necessary, however, the automotive lamp may be modified in such a manner that two or more lamp chambers having different shapes and sizes are arranged in a nonlinear, compact form.

As an example, the automotive lamp according to the invention can be formed by building therein at least two of the stop lamp doubling as the tail lamp, the turn signal lamp and the back-up lamp in an arbitrary pattern and combination. Generally, the stop lamp doubling as the tail lamp, the turn signal lamp and the back-up lamp can be arranged vertically or horizontally in that order or in a different order. Also, as a modification, comparatively long stop lamps doubling as tail lamps are arranged in a row, and turn signal lamps and back-up lamps of the same total length are arranged as an adjacent row.

In the automotive lamp of the present invention, a light emitting opening of the lamp chamber is covered by a lamp cover. The lamp cover comprises, usually, a transparent cover body and a polarizing film applied to an inner surface of the cover body. The cover body is not particularly limited as long as it has a configuration and size capable of covering at least the light emission surface of the lamp chamber, but is generally rectangular, square, or circular in shape, and in some case, may have a modified pattern such as a L-shape.

The cover body may be colored in different hue for each lamp chamber as required, that is, in accordance with the hue of light emitted from it. For example, the cover of a stop and tail lamp that is required to emit red light is colored in red, and the cover of a turn signal lamp that is required to emit amber color light is colored in amber color. Alternatively, in place of coloring the cover, a colorless cover may be used with a colored lamp, or with a colored cap around a colorless lamp. By using such alternative methods, appearance different from that of a colored cover can be obtained. Needless to say, the cover of the colorless back-up lamp needs not be colored.

A colorless or colored cover body can be advantageously formed by molding of any light transmissive resin. Suitable molding methods include ordinary molding methods, for example, injection molding, vacuum molding, etc. Resin raw materials that can be used include, but are not limited to, styrene resins, hard vinyl chloride resins, acrylic resins, polycarbonate resins, etc. In particular, an acrylic resin can be advantageously used, since it is excellent in strength and transparency, and coloring processing can be advantageously performed.

In manufacturing a colored cover body, suitable amount of coloring agent may be mixed with above-described resin raw material. Suitable coloring agent include, but are not limited to, perylene pigments, azo pigments, pigment such as iron oxide, or dyes such as quinophthalone dyes, azo dyes, disazo dyes, anthraquinone dyes, benzopyrane dyes (all from Color Index). Dyes such as azo dyes and disazo dyes can be particularly advantageously used since they have excellent dispersibility in resins and have also good tranparency and weather resistance.

In the manufacture of the cover body, in addition to coloring agent, other additives ordinarily used in the field of plastic molding may be mixed. Suitable additives include, for example, UV absorber, light stabilizer, heat stabilizer, etc. Examples of UV absorbers include, but are not limited to, benzotriazole, benzophenone, diphenyl acrylate and amine UV absorbers.

The cover body may have its inner surface (on the lamp side) invested with textured pattern. The texture pattern may be formed, for example, on a metal die, and at molding stage, may be transferred from the metal die to the molding (lamp cover).

In the lamp cover of the present invention, a polarizing film is provided on the inner surface of the cover body. The polarizing film may be a single film or sheet, as long as the desired effect can be obtained. The polarizing film may auxiliarily include additional layers, if necessary.

The polarizing film is preferably formed from a transparent material. Transparent materials that can be used for forming the polarizing film are, for example, polyester film, polyethylene film, polycarbonate film, vinyl chloride film, acrylic film, polyurethane film, polyolefin film, vinylidene fluoride film, etc. The polarizing film may be manufactured, after mixing resin raw material and coloring agent, for example, as required, using typical molding method such as calender molding, etc., to desired thickness. Thickness of the polarizing film may be varied widely depending upon the site of use in the lamp cover, but is typically in the range of about 5 to 500 $\mu m$, and preferably in the range of about 20 to 100 $\mu m$. If thickness of the polarizing film is less than 5 $\mu m$, it is no longer possible to obtain it in the form of a film. If, on the contrary, thickness of the polarizing film is more than 500 $\mu m$, the increase of thickness may adversely affect the operative effect of the invention.

The polarizing film preferably transmits P polarized light and reflects S polarized light, but has optical characteristics such that the reflected light is transmitted through the polarizing film after the polarization is removed upon its multiple reflection. Such an optical characteristics is preferably obtained by textured structures of the surface of the polarizing film, selected from linear triangular or semi-cylindrical prisms, triangular pyramid-shaped or rectangular pyramid-shaped prisms or a combination thereof.

The polarizing film exhibiting above-described optical characteristics is used typically as an optical element for a back-light in a panel type liquid crystal display device, and is commercially available in the form of a prism sheet or a lens film. Particularly suitable polarizing film is a luminance increasing film. A luminance increasing film is available, for example, under the Vikuiti™ trade name as "BEF" series and "RBEF" series etc., from 3M Co. This series of polarizing films have a linear pattern of prisms measuring a few tens of $\mu m$. Such a polarizing film is preferably disposed with the prismatic surface facing toward the light source. Low gloss processing of the surface opposite to the prismatic surface is also effective in view of obtaining sense of uniformity.

The polarizing film may be provided as a sheet along the cover body, or may be applied to the cover body via an adhesive layer. The adhesive layer used may be formed using ordinary adhesive generally used in the field of adhesive tape or pressure sensitive adhesive tape. Suitable adhesives include, for example, acrylic adhesives, polyurethane adhesives, polyester adhesives. In particular, an acrylic adhesive can be used advantageously in view of its weather resistance. Thickness of the adhesive layer may be varied widely, but is typically in the range of about 10 to 500 $\mu m$, and more preferably in the range of about 20 to 100 $\mu m$. If thickness of the adhesive layer is less than 10 $\mu m$, satisfactory adhesive strength cannot be obtained. If, on the contrary, thickness of the adhesive layer is more than 500 $\mu m$, overall thickness of the polarizing film becomes undesirably large. When the polarizing film is actually applied to the lamp cover, the harmony with the lamp cover is evidently impaired.

In the automotive lamp of the present invention, an optional optical element may be disposed in the lamp chamber between the light source and the lamp cover. Suitable optical element is, for example, a filter element or an inner lens. For example, by interposing a colored filter element or inner lens, specific appearance and effect derived from the filter can be obtained. The optical element may be a plastic film or sheet or plate, or a glass plate.

Now, the present invention will be described in detail in the following with reference to appended drawings showing examples thereof. It is to be understood that the present invention is by no means limited to the examples described below.

FIG. 1 is a sectional view showing an example an automotive lamp constructed according to the present invention. The lamp 20 shown comprises a lamp chamber 21 of a red-light emitting stop and tail lamp. The lamp chamber 21 has a light source (bulb) 22, fitted to a socket (not shown), of a predetermined luminance with red paint applied to the surface so as to exhibit the red color of a stop and tail lamp. The lamp chamber 21 is opened in the front face to form a light emitting opening 25. In the lamp chamber 21, the bottom wall around the light source 22 is invested with a concave mirror structure 21a so as to collimate light from the light source 22 and emit it from the light emitting opening 25 out of the chamber (see arrows L). The light emitting opening 25 of the lamp chamber 21 is covered with a lamp cover 10 colored in amber color. On the inner surface of the lamp cover 10, a polarizing film 11 is applied with textured structures facing toward the light source. The polarizing film 11 is a film having fine textured structures on its surface (here, a prism sheet, BEF series available from 3M Co., is used.).

Figure 2:
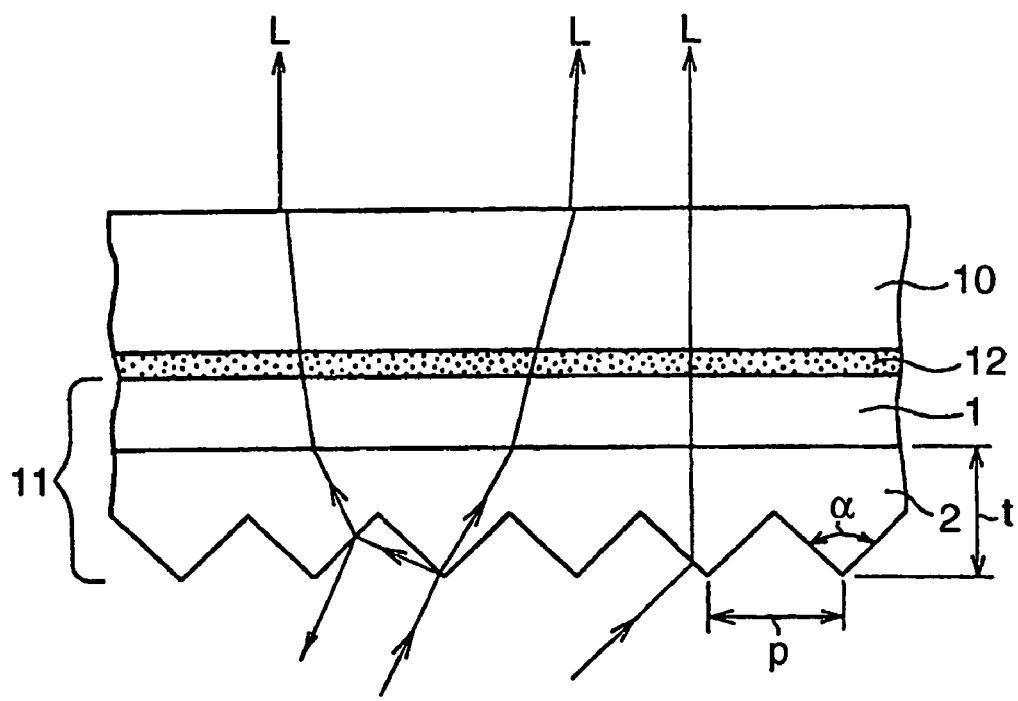
FIG. 2 is an enlarged cross-sectional view showing the vicinity of the lamp cover of the lamp of FIG. 1.

FIG. 2 is an enlarged view showing, in the lamp 20 of FIG. 1, a vicinity of the lamp cover 10 and the polarizing film 11. As has been described above, the polarizing film 11 is a prism sheet, BEF series, available from 3M Co., and thus, comprises a substrate 1 made of a polyester film and a polarizing layer 2 formed thereon (linear acrylic prism sheet). The acrylic prism 2 used has thickness t of about 200 μm and apex angle α of 90°, and the pitch p of the prism is 50 μm. The polarizing film 11 is applied to the lamp cover 10 via adhesive layer 12.

The prism sheet used as a polarizing film in the present invention will be generally described below. Thickness of the sheet is typically in the range of about 50 to 300 μm, preferably in the range of about 100 to 250 μm, and more preferably in the range of about 150 to 200 μm. Pitch p of the prism is typically not greater than 1 mm, preferably about 10 to 500 μm, and more preferably about 24 to 250 μm. The apex angle α of the prism is typically not greater than 130°, preferably in the range of about 50 to 120°, and more preferably in the range of about 70 to 100°. As the structure of the prisms, prisms may be arranged regularly, or they may be arranged in random, and similarly, the pitch may be non-uniform. The apex angle of the prism may be rounded (may have a finite radius of curvature).

In the automotive lamp as shown, a film processed in fine prisms (prism sheet) as used in a back light for liquid crystal display panel is provided between the light source and the lamp cover, and a cover color such that light from the light source acquires a predetermined functional color when emitted through the lamp cover out of the lamp chamber, is adopted in combination with the color of the light source that is different from the cover color, so that the functional color and the cover color can be made different from each other. In addition, since a prism sheet is used in the present invention, operative effect of the invention for preventing the recognition of the color of the light source under unlit conditions is very high so that only the cover color can be seen under unlit conditions and color difference between lighting/unlit conditions can be made very conspicuous.

Figure 3:
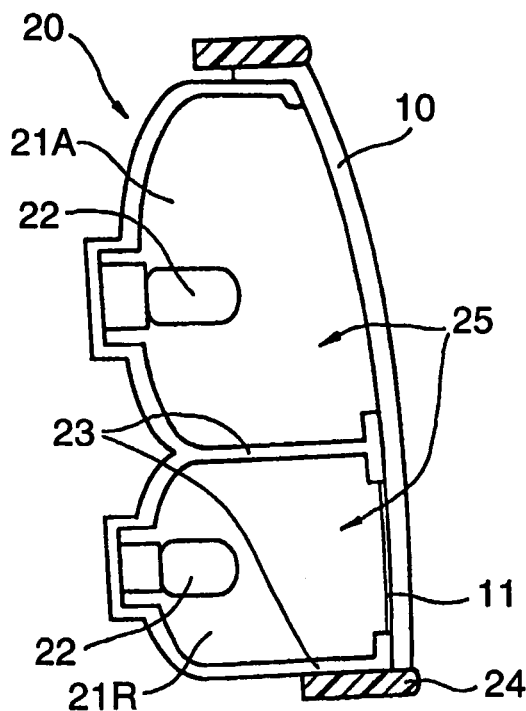
FIG. 3 is a cross-sectional view for explaining the application of the automotive lamp of the present invention to a rear combination lamp.

FIG. 3 is a sectional view showing an example of the lamp according to the present invention applied to a rear combination lamp. The rear combination lamp 20 as shown in FIG. 3 has the structure in which two lamp chambers, that is, a lamp chamber 21R for a red stop and tail lamp and a lamp chamber 21A for an amber color turn signal lamp, are combined. Each of the lamp chambers is separated from each other by a partition wall 23, with a light source (bulb) 22 of a predetermined luminance being fitted into a socket (not shown) in each lamp chamber. The light source 22 of the lamp chamber 21A is colorless, and the light source 22 of the lamp chamber 21R is red. The lamp chamber is opened in one face thereof to form a light-emitting opening 25. Also, the lamp chamber has its bottom wall around the light source 22 invested with a concave mirror structure so as to collimate light from the light source 22 and emit it through the light emitting opening 25 out of the chamber. Further, the light emitting opening 25 of each lamp chamber is covered with a common lamp cover 10 colored in amber color for the turn signal lamp. The lamp cover 10 is mounted with a fringe 24. In the lamp chamber 21R for the stop and tail lamp, a polarizing film 11 is provided on the inner surface of the lamp cover 10 with the textured structure facing toward the light source, at a position 1 to 3 mm away from the cover surface. The polarizing film 11 is a film having fine textured structure on its surface (here, a prism sheet, BEF series, manufactured by 3M Co. is used).

By using this procedure to combine lamps having same cover color and different functional color and to adjust, for example, such that the direction indicator is yellow both under unlit and lit conditions, and the brake lamp is yellow under unlit conditions and red under lit conditions, same yellow color is recognized under unlit conditions and good quality of appearance can be achieved with high uniformity.

Since prism pitch is sufficiently fine and precise, the prism processing cannot be recognized both under unlit conditions and lit conditions so that homogeneous and good appearance can be obtained.

In the rear combination lamp as shown in FIG. 3, the polarizing film may be provided not only in the lamp chamber for the stop and tail lamp, but also in the lamp chamber for the turn signal lamp at the same time, and sense of higher uniformity can be attained under unlighting conditions.

Figure 4:
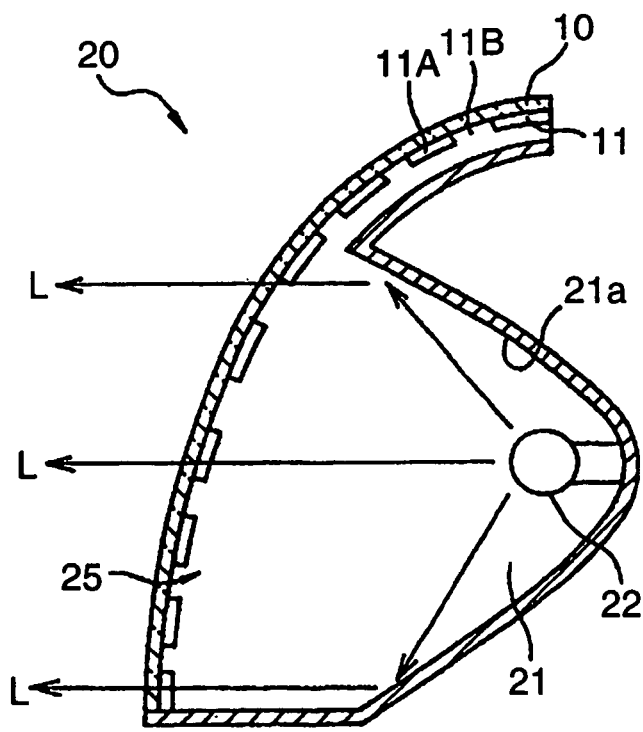
FIG. 4 is a sectional view showing a configuration example of an automotive lamp according to the invention.

FIG. 4 is a sectional view showing a configuration example of the automotive lamp according to the invention. The automotive lamp according to the invention will be explained in detail below with reference to this drawing.

A lamp 20 shown has a lamp chamber 21 of an amber-colored turn signal lamp. The lamp chamber 21 has a light source (bulb) 22 of predetermined illuminance fitted in a socket (not shown). The lamp chamber 21 has an open front surface making up a light-exiting opening 25. Also, the bottom wall around the light source 22 of the lamp chamber 21 has a concave mirror structure 21a, so that the light of the light source 22 can be condensed and emitted outside of the chamber from the light-exiting opening 25 (see arrows L). Further, the light-exiting opening 25 of the lamp chamber 21 has mounted thereon a lamp cover 10 colored in amber.

Furthermore, a film-like selective polarizing layer 11 is attached on the inner surface of the lamp cover 10 with the finely textured structure thereof directed toward the light source.

Figure 5:
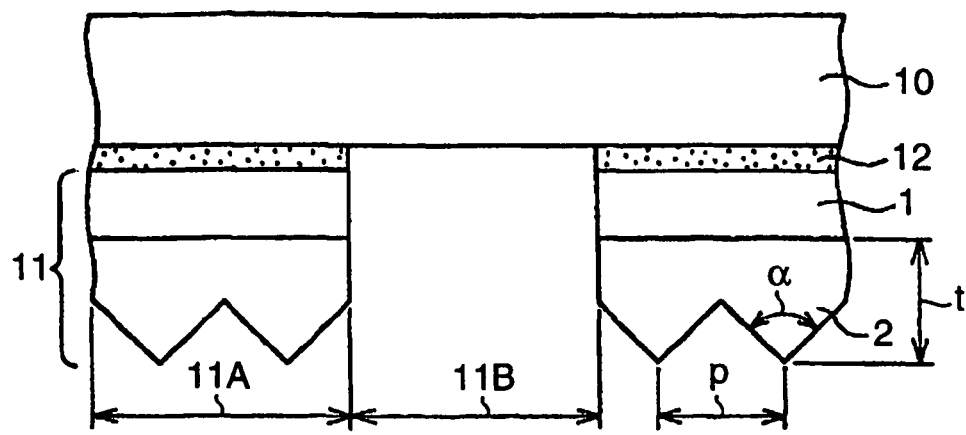
FIG. 5 is a sectional view showing in enlarged form the neighborhood of the lamp cover of the lamp shown in FIG. 4.

FIG. 5 shows, in enlarged form, the neighborhood of the lamp cover 10 and the selective polarizing layer 11 of the lamp 20 shown in FIG. 4. As shown, the selective polarizing layer 11 is such that a polarizing film with a finely textured structure formed on the surface thereof is cut and attached through an adhesive layer 12 and used as structure portions 11A, while leaving the space between the structure portions 11A as it is in the form of a non-structure portion 11B. The polarizing film used for forming the structure portions 11A, as explained below, is made of Prism Sheet, BEF Series of 3M, and therefore include a base member 1 of polyester film and a linear acrylic prism sheet 2 formed thereon. The polarizing film 2 used in this case has a thickness t of about 200 μm, an apex angle α of 90° and a prism pitch p of 50 μm. By the way, a piece of the polarizing film, which is attached on the lamp cover 10 through the adhesive layer 12 in the shown case, may be mounted by another means, if required.

In the automotive lamp according to the invention, as shown, the lamp cover is mounted on the light-exiting opening of the lamp chamber. The lamp cover, though not normally limited as far as it has such a shape and size as to cover at least the light-exiting surface of the lamp chamber, is generally rectangular, square or circular in shape, and in some cases may have an L-shaped or the like different pattern.

The lamp cover, if required, may be colored in a different color for a different lamp chamber in accordance with the color of the light exited therefrom. For example, the cover of the stop lamp doubling as the tail lamp required to emit the red light is colored in red, and the cover of the turn signal lamp required to emit the amber light is colored in amber. As an alternative method, instead of coloring the cover, a colored lamp is used with a colorless cover or a colored cap is applied over a colorless lamp. The use of any of these alternative methods can produce a different appearance than a colored cover. The cover of the colorless back-up lamp is not of course required to be colored.

The colorless or colored lamp cover can be advantageously formed by molding an arbitrary translucent resin. An example of an appropriate molding process is the ordinary molding process such as the injection molding or the vacuum molding. The resin material used for molding, though not limited to those listed below, includes styrene resin, hard vinyl chloride resin, acrylic resin or polycarbonate resin. Especially, acrylic resin can be used advantageously due to its high strength and transparency and the possibility of advantageous coloring.

Further, in the case where a colored lamp cover is produced, an appropriate amount of a coloring agent can be mixed with the resin material described above. The proper coloring agent includes but is not limited to a pigment such as perylene pigment, azo pigment or iron oxide pigment, or a dye such as quinophthalone dye, azo dye, diazo dye, anthraquinone dye or benzopyran dye (all of which are cited from the color index). In embodying the invention, the dye such as the azo dye or the disazo dye can be used especially advantageously due to their superior dispersibility in the resin, good color development characteristic and good weatherability.

In producing the lamp cover, the resin material may be mixed with an additive commonly used in the field of plastic molding, in addition to the coloring agent. The proper additive includes an ultraviolet absorbent, a light stabilizer or a heat stabilizer. For example, the proper ultraviolet absorbent includes but is not limited to the benzotriazole group, benzophenone group, the diphenyl acrylate group or the amine group.

The inner surface (the surface nearer to the light source) of the lamp cover may be formed with a textured pattern. The textured pattern can produce the function of a lens body or retroreflection. The textured pattern can be transferred from a die preformed with the particular pattern to a mold (lamp cover) in the molding stage.

The lamp cover, which is normally produced by molding from the translucent resin as described above, may alternatively be produced from an inorganic material such as glass in the case where the feeling of a higher quality is wanted or for other purposes.

In the lamp according to this invention, a selective polarizing layer is formed further on the inner surface of the lamp cover. The selective polarizing layer is defined as a layer having a partial polarizing function, i.e. a layer preformed, in a predetermined pattern, with structure portions having a finely textured structural surface (these portions are involved in polarization) and non-structure portions having no such textured structure. The word "layer" as used in this specification means such a form as a film or a sheet in addition to a form of a thin layer such as a thin film or layer, and further includes, as a special case, a comparatively thin area included in a material.

The selective polarizing layer can be formed advantageously by partially applying a polarizing film having a textured structural surface corresponding to the structure portions thereof to the inner surface of the lamp cover. After cutting the polarizing film to predetermined shape and size, for example, the resulting pieces of the polarizing film can be attached to or arranged along the inner surface of the lamp cover. An example of this method was explained above with reference to FIG. 5.

Figure 6:
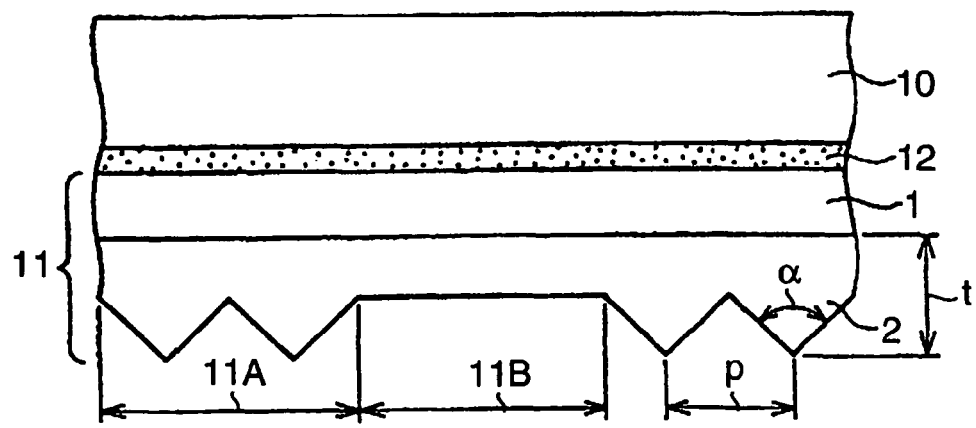
FIG. 6 is a sectional view showing a modification of the lamp shown in FIG. 4.

According to another method, the selective polarizing layer can be formed advantageously by applying a polarizing film having the pattern of the structure portions and the non-structure portions of the particular selective polarizing layer to the inner surface of the lamp cover. As shown in FIG. 6, for example, the textured structure of a polarizing film is partially removed from the surface thereof, after which the resulting film can be attached to or arranged along the inner surface of the lamp cover. As shown, the textured structural part of the polarizing film is utilized for forming the structure portions 11A and the part with the textured portions removed therefrom is utilized as the non-structure portions 11B. Also in this case, the polarizing film may be mounted on the lamp cover 10 by another means than the adhesive layer 12.

The polarizing film used advantageously in embodying this invention will be explained in more detail. As long as the desired polarization effect is obtained, the polarizing film may either be formed of a single film or sheet, or otherwise may include a base member and a polarizing layer formed thereon. In the latter case, the base member is normally a smooth film or sheet and the polarizing layer thereon is a film or sheet having a finely textured structure. The polarizing film may have an additional layer in an auxiliary fashion, if required.

The polarizing film is preferably formed of a transparent material. The transparent material used for forming the polarizing film includes a polyester film, a polyethylene film, a polycarbonate film, a polyvinyl chloride film, an acrylic film, a polyurethane film, a polyorefin film or a vinylidene fluoride film. The polarizing film can be fabricated to the desired thickness by use of the ordinary molding process such as the calendar molding process after mixing a resin material or, if required, a coloring agent or the like. The thickness of the polarizing film, though changeable widely depending on the part of the lamp cover where it is used, is normally in the range of about 5 to 500 μm, or more preferably in the range of about 20 to 100 μm. If the thickness of the polarizing film is less than 5 μm, it is no longer possible to obtain a film. In the case where the thickness is over 500 μm, on the contrary, the increased thickness may have an adverse effect on the operational effects of the invention.

The polarizing film preferably transmits the P polarized light and reflects the S polarized light. The reflected S polarized light has such an optical characteristic as to be transmitted through the polarizing film after the polarized light is removed by multiple reflection. This optical characteristic can be obtained by selecting, preferably as a textured structure of the polarizing film, from linear triangular prisms, pseudo-triangular prisms with one or both of the apex angles of adjacent triangles of the linear triangular prisms rounded, triangular prisms having a shape corresponding to the shape of the pseudo-triangular prisms with a part thereof removed, semicylindrical prisms, triangular or rectangular pyramidal prisms or a combination thereof. Especially, the linear prism presents double internal images and therefore is suitable for improving the stereoscopic feel. In the case where special effects are desired, the apex angle portions of these prisms may be partially removed or the corners between prism elements may be rounded.

The polarizing film exhibiting the above-mentioned optical characteristic is normally used as an optical element for back light in the panel-like liquid crystal display apparatus, and commercially available as a prism sheet or a lens film. The luminance increasing film is an especially suitable polarizing film. The luminance increasing film is commercially available as the products of 3M having such trade names as "BEF" Series or "RBEF" Series. These luminance increasing films are normally machined to form linear prisms as fine as about several tens of μm. Further, the polarizing film is preferably arranged with the prism surface thereof nearer to the light source. Also, the feeling of uniformity can be effectively secured by reducing the gloss of the surface opposite to the prism surface.

The prism sheet used for forming the selective polarizing layer according to the invention will be described in general terms with reference to FIGS. 2 and 3. The sheet thickness t is normally in the range of about 5 to 500 μm, preferably in the range of about 100 to 250 μm, or more preferably in the range of about 150 to 200 μm. The prism pitch p, on the other hand, is normally 1 mm or less, preferably in the range of about 10 to 500 μm, or more preferably in the range of about 24 to 250 μm. An excessively large pitch p is undesirable as the pitches would become too salient hampering the improvement in appearance. Further, the apex angle α of the prism is normally 150° or less, preferably in the range of about 50° to 120°, or more preferably in the range of about 70° to 100°. The apex angle α of the prism may be excessively small without any problem, whereas an excessively large apex angle α is undesirably lessens the improvement of the stereoscopic feeling due to an image shift. The prism structure may be such that the prisms are arranged in either orderly or random fashion. Also, the pitches may be not uniform. Further, the apex of the prisms may be machined to round shape (may be rounded).

The polarizing film is normally attached on the cover body through an adhesive layer. The adhesive used for this purpose includes the one ordinary used in the field of adhesive tape or adhesive-backed tape, such as the adhesive of pressure-sensitive type, heat-sensitive type or photo-curable type. Examples of the proper adhesive include the acrylic adhesive, the polyurethane adhesive and the polyester adhesive. Taking the weatherability into consideration, the acrylic adhesive can be used especially advantageously. The thickness of these adhesive layer, though changeable over a wide range, is normally in the range of about 10 to 500 μm, or more preferably in the range of about 20 to 100 μm. In the case where the thickness of the adhesive layer is less than 10 μm, satisfactory adhesive power cannot be obtained. In the case where the thickness exceeds 500 μm, on the other hand, the thickness of the polarizing film as a whole undesirably increases greatly. In fact, the feeling of inconsistency with the cover resin would occur when the polarizing film is attached to the lamp cover. The polarizing film, if desired, can be mounted on the lamp cover by a method without using an adhesive layer.

Figure 7:
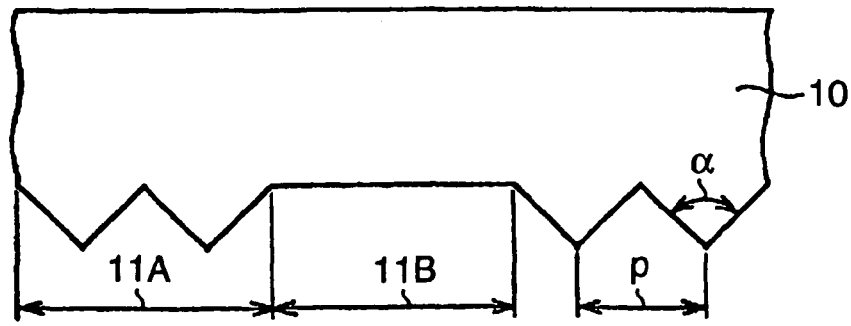
FIG. 7 is a sectional view showing another modification of the lamp shown in FIG. 4.

In the automotive lamp according to this invention, the selective polarizing layer may be formed without using the polarizing film. The inner surface of the lamp cover can be formed with a selective polarizing layer, for example, by processing the patterns of the structure portions and the non-structure portions of the selective polarizing layer. In molding the lamp cover, this method can be implemented advantageously normally by preforming the patterns of the structure portions and the non-structure portions on a molding die, for example, and transferring the patterns from the die to the mold (lamp cover) in the molding stage. Instead of using the die, a metal plate may be pressed against to form a shape. FIG. 7 schematically shows such an example. One surface of the lamp cover 10, like in the case explained above with reference to FIGS. 2 and 3, is formed with a selective polarizing layer (which assumes the form of a selective polarizing area in the shown case) including the structure portions 11A alternating with the non-structure portions 11B.

In the automotive lamp according to this invention, the selective polarizing layer formed on the lamp cover preferably has the "transparency degree", which is defined as the ratio of areas between the non-structure portions and the structure portions, normally in the range of 5 to 90%. More preferably, the transparency degree is in the range of 10 to 85%, or most preferably in the range of 20 to 70%.

As long as the transparency degree described above can be secured, the selective polarizing layer can be an arbitrary combination of the non-structure portions and the structure portions, and therefore can have an arbitrary pattern. The proper patterns include but are not limited to stripes, round holes, dots, triangular holes, square holes, grid holes or checkers. A pattern with thin lines distributed dispersedly is also effective as a modification of the stripes. If required, any of these patterns can be combined to form a selective polarizing layer. These patterns may make up either the non-structure portions or the structure portions. The size of each pattern can be changed arbitrarily in accordance with the design effect desired to be developed.

Figure 8A:
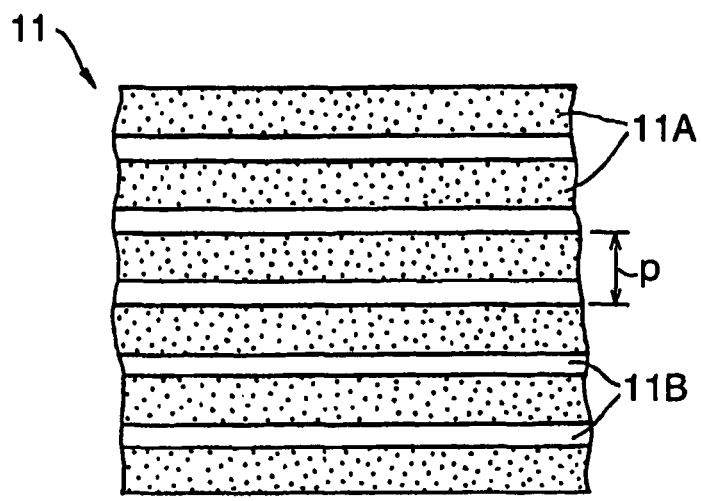
FIGS. 8A, 8B and 8C are each a schematic diagram showing an exemplary pattern of the selective polarizing layer.
Figure 8B:
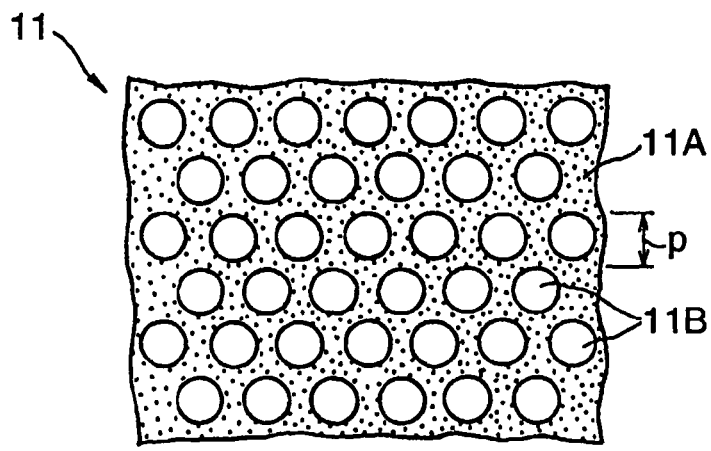
Figure 8C:
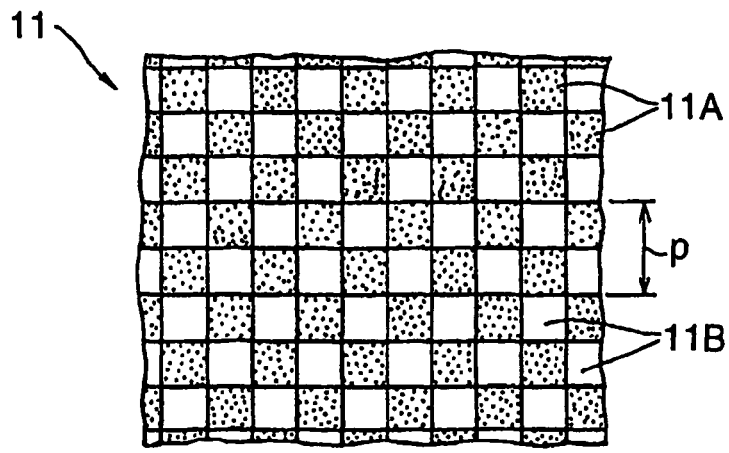

FIGS. 8A, 8B and 8C are each a plan view showing exemplary patterns of the selective polarizing layer. The selective polarizing layer 11 in FIG. 8A represents a case in which a striped pattern is formed by alternating between the striped structure portions 11A and the striped non-structure portions 11B at the same pitch p. The selective polarizing layer 11 shown in FIG. 8B, on the other hand, represents a case in which a holed pattern is formed by alternating between the solid structure portions 11A and the non-structure portions 11B of round holes at the same pitch p. Further, the selective polarizing layer 11 shown in FIG. 8C is a case in which a checkered pattern is formed by alternating between the square structure portions 11A and the square non-structure portions 11B of the same size at the same pitch p.

By the way, the shown patterns can be formed by various techniques. For example, as described above, a polarizing film prepared is cut off, and the polarizing film pieces thus obtained are attached to the lamp cover. Alternatively, after removing the textured structure partially from the surface of a polarizing film, the polarizing film thus subjected to the surface treatment is attached to the lamp cover. As another alternative, the polarizing film may be formed with openings of non-structure portions such as stripes, grids or dots by punching. As still another alternative, the polarizing film is formed with slits.

With the automotive lamp according to the invention, an arbitrary optical element may be arranged between the light source and the lamp cover in the lamp chamber. An example of the proper optical element is a filter element. The interposition of a colored filter element, for example, can produce an appearance effect unique to the particular filter. The filter element may be either a plastic film, sheet or plate or a glass plate.

Figure 9:
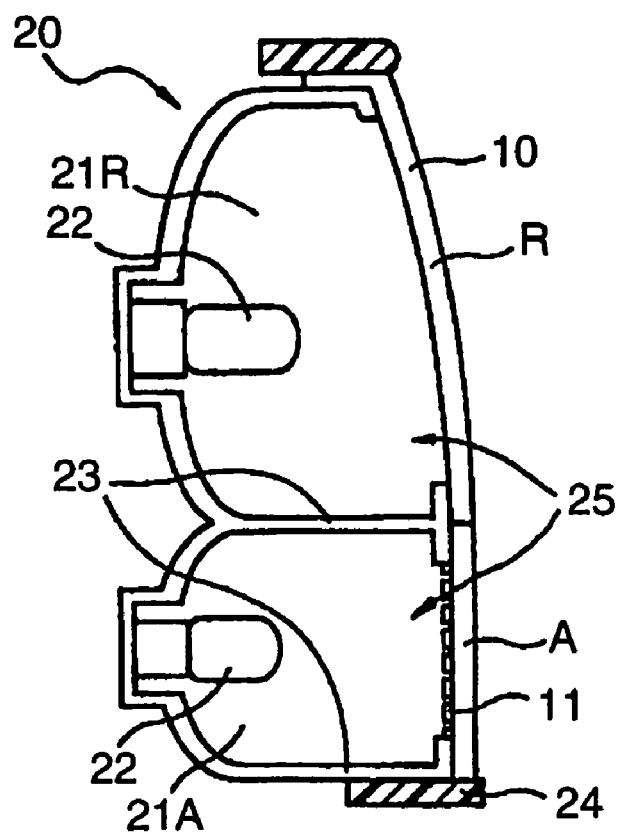
FIG. 9 is a sectional view for explaining the use of the lamp according to the invention for the rear combination lamp.

FIG. 9 is a sectional view showing an example of application of the lamp according to the invention to the rear combination lamp. The shown rear combination lamp 20 has such a structure that two lamp chambers, i.e. a lamp chamber 21R of a red stop lamp doubling as a tail lamp and a lamp chamber 21A of an amber turn signal lamp are combined with each other. These lamp chambers are partitioned from each other by the partitioning walls 23 and each have fitted therein a light source 22 of a predetermined illuminance. Each lamp chamber has an open front surface forming a light-emitting opening 25. Also, in each lamp chamber, the bottom wall around the light source 22 has a concave mirror structure, so that the light of the light source 22 can be condensed and emitted out of the chamber from the light-emitting opening 25. Further, the light-emitting opening 25 of each lamp chamber has mounted thereon a common lamp cover 10. The lamp cover 10 has a tone of red (R) and amber (A) corresponding to the color of the light emitted from the lamp chamber involved. The lamp cover 10 is mounted on the lamp chamber 21 by a rim 24.

Figure 10:
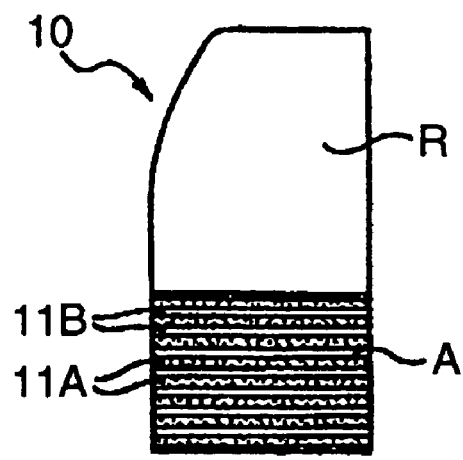
FIG. 10 is a schematic diagram showing the appearance of the lamp cover of the rear combination lamp shown in FIG. 9.

Also, a selective polarizing layer 11 is attached on the inner surface of the lamp cover 10 of amber (A) with the textured structure thereof directed toward the light source. The selective polarizing layer 11 is composed of a polarizing film (which is Prism Sheet, RBEF Series of 3M in this case) having a finely striped textured structure cut and attached on the surface thereof. When the lamp chamber 21A is viewed from outside with naked eyes, the prism structure of the selective polarizing layer 11 is so fine and therefore difficult to recognize visually. As shown in FIG. 10, however, the structure portions 11A and the non-structure portions 11B are arranged alternately with each other in stripes.

Figure 11:
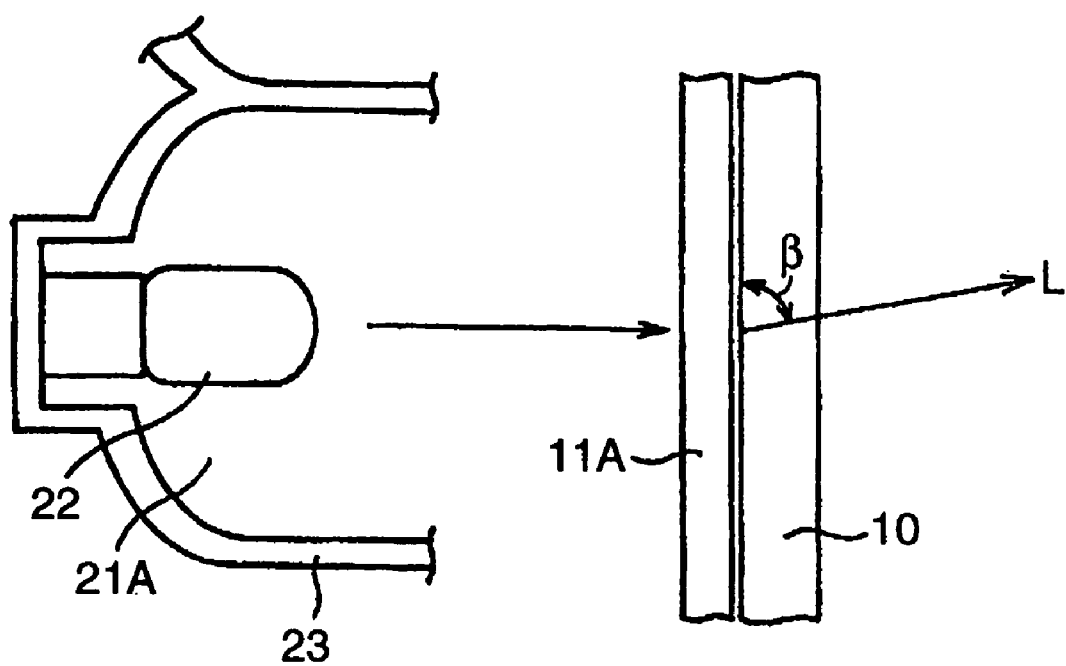
FIG. 11 is a schematic diagram showing the emission of light from the structure portions of the rear combination lamp shown in FIG. 9.

The use of the automotive lamp according to the invention having the selective polarizing layer described above in detail can produce a great variety of superior appearances in accordance with the change of the angle of light incidence and the change of the visual angle of the observer. FIG. 11 is a horizontal sectional view schematically showing the structure portions of the amber lamp chamber 21A of the rear combination lamp shown in FIG. 9. The light that has left the light source 22 is changed in direction angle by the fine structure of the structure portions 11A of the polarizing film and emitted at the angle of $\beta$ from the surface of the lamp cover 10. Specifically, the angle $\beta$ at which the light is emitted is 20° in the case where the prism film 1 shown in Table 3 is used as the structure portions (polarizing film), while the angle is about 30° when using the prism film 4. The direction in which the light is emitted is along the exiting optical axis contained in the plane including the axis and the incidence light axis in the polarizing film surface perpendicular to the length of the prism structure.

Figure 12:
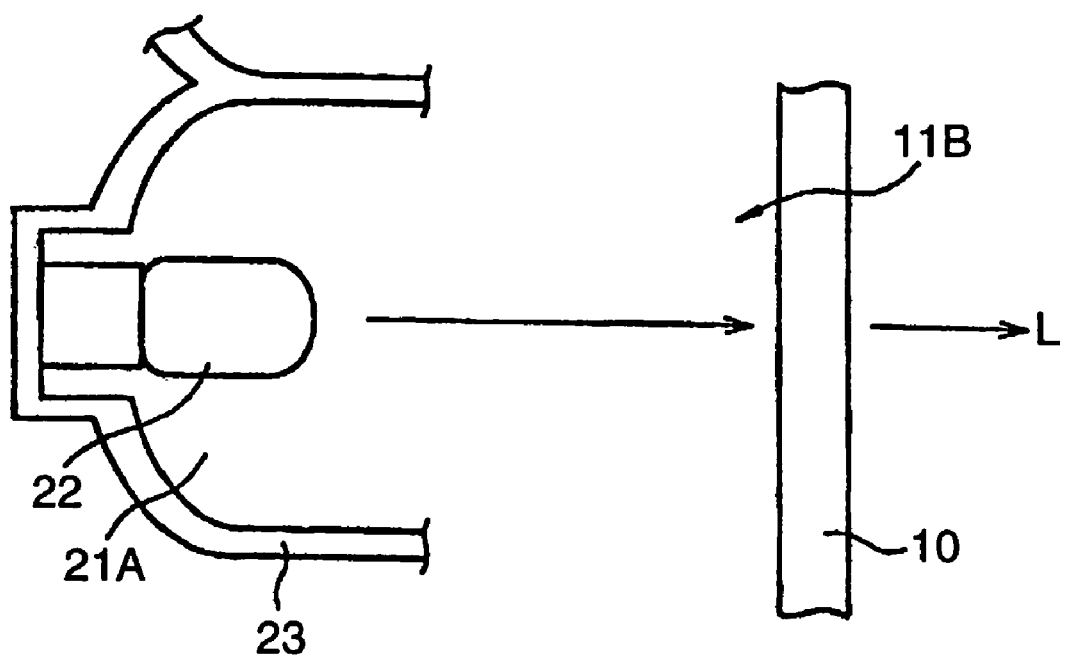
FIG. 12 is a schematic diagram showing the emission of light from the non-structure portions of the rear combination lamp shown in FIG. 9.

On the other hand, FIG. 12 is a horizontal sectional view schematically showing the non-structure portions of the same amber lamp chamber 21A as in FIG. 11. As shown, the light that has left the light source 22 is emitted from the surface of the lamp cover 10 without changing the angle thereof.

The automotive lamp according to a preferred embodiment of the invention was explained above. The automotive lamp according to the invention, as obvious from the foregoing description, is characterized in that a film or the like finely machined into prisms as used for the liquid crystal panel back light is attached on or arranged along the inner surface of a smooth lamp cover, or the inner surface of the lamp cover is machined in similar fashion. In the case where prism sheets with the pitch of several tens of µm are arranged repeatedly on the inner surface of the lamp cover at intervals of 1 cm to several cm, for example, the sheet is visible on the surface (structure portions) in the presence of the prism sheets while the interior of the lamp chamber is visible from the surface (non-structure portions) lacking the prism sheet. Therefore, the external appearance can be obtained which emphasizes the feeling of depth as in the prior art. Further, with the lamp according to the invention, the pitch of the prism sheet is so small that the prisms appear not formed on the sheet surface, thereby producing a surface of an appearance uniform and high in quality. Furthermore, with the lamp lit, the function of controlling the light path angle accurately with fine prisms, when viewed diagonally, raises the appearance of the light source especially from the surface having the sheet with respect to the surface having no prism sheet. This is an entirely novel appearance never experienced in the past. This effect is also achieved for the rear visibility of the turn signal lamps arranged at the corner portions. The conventional method has the disadvantage that the pitches of the prisms are undesirably visible. With the lamp according to the invention, on the other hand, the presence of the prism sheets is not recognizable, and therefore a novel appearance of high quality is obtained. Further, the employment of a technique for attaching or mounting the prism sheets facilitates the improvement by machining the conventional lamp into the lamp according to the invention. Also, various appearances can be selectively obtained by changing the pattern of the prism sheets or the manner in which the prism sheets are attached or arranged.

Next, actual fabrication of the automotive lamp of the present invention and result of evaluation on the appearance under unlighting conditions and lighting conditions will be described below.

EXAMPLES

Examples of the invention will be explained in detail below. It should be understood that the present invention is not limited to the examples described below.

Examples 1 to 15 and Comparative Examples 1 to 3

Fabrication and Evaluation of the Polarizing Film:

14 types of polarizing films as described in Table 1 below were prepared. Except films No. 13 and 14, the polarizing films prepared in these examples were all prism films, with films No. 1 to 11 being products of Sumitomo 3M Co. under the Vikuiti™ trade name. The product descriptions are shown in the Film name column), and films No. 12 and 13 have the structures described in Table 1. All prism films had the prism structure only on one surface. The film No. 14 is a product manufactured by Teijin Co. (Trade name; U4).

Each of the polarizing film was applied to an inner surface of an amber colored lamp cover of a rear combination lamp of an automobile. Two possible orientations of the applied polarizing film were denoted as A: the prism surface facing toward the light source, and B: the prism surface facing toward the lamp cover. As an adhesive, an acrylic pressure sensitive adhesive available from Soken Chemical & Engineering Co. as product No. 1429F-2, was used, and was applied to the peripheral edge of joint surface of the polarizing film in a layer of about 5 mm in width and about 40 μm in thickness. The polarizing film was thus attached to the inner surface of the lamp cover at a distance of 1 to 3 mm. A transparent red filter was attached to the lamp cover on the side of the light source such that, under lighting conditions, color of the light transmitted through the cover becomes same as the emitted light of the stop and tail lamp.

The rear combination lamp prepared as described above was visually evaluated with respect to (1) appearance under unlit conditions, and (2) appearance under lighting conditions. The distance from the observer to the lamp was 10 m. Measurement result as shown in Table 2 below was obtained.

Considerations

In Comparative Example 1, no polarizing film was used so that red color of a red filter disposed in the interior was seen through the cover resulting in same red appearance both under unlit conditions and lighting conditions.

In Comparative Examples 2 and 3, the red color of the filter disposed in the interior was made difficult to be seen due to light dispersion produced by tin deposition or low gloss agent (particles), and under unlit conditions, amber color of the cover that is different from the color under lit conditions was seen. However, since light under lit condition was also affected by the light dispersion, emitted light was weak and only dark red appearance was obtained.

In Examples 1 to 15, films having fine prism structures were used as the polarizing film, so that amber color was seen under unlighting conditions, and under lighting conditions, light emission in light red as bright as in Comparative Example 1 was possible.

Further, following points were considered.

The prism of the polarizing film can be formed from various resin material. For example, acrylic resins, polycarbonate resins, or polyurethane resins, can be used to obtain comparable result.

Pitch of the prisms may be uniform or may be varied at random. Apex of the prisms may have an angle, or may have no distinct angle and have a finite radius of curvature. Both types of prisms are effective.

Sectional shape of the prisms may be optionally modified. Triangular shape of the prisms may be either symmetric or asymmetric. And, prisms may be either linear or pyramid-shaped. Both types of prisms are effective.

When the polarizing film is provided on the inner surface of the lamp cover, the lens structure surface may be directed toward the lamp cover as well as toward the light source to obtain nearly same effect.

TABLE 1

| Film No. | Film name | Structure | Surface pattern | Apex angle $\alpha$ (°) | Pitch $\rho$(μm) | Remark |
|---|---|---|---|---|---|---|
| 1 | BEFII 90/50 | polyester film + acryl prism | linear prism | 90 | 50 | |
| 2 | BEF II 90/24 | ↑ | ↑ | 90 | 24 | |
| 3 | BEF II 100/31 | ↑ | ↑ | 100 | 31 | |
| 4 | TRAF II | ↑ | ↑ | 70 | 31 | |
| 5 | TRAF | Polycarbonate | ↑ | 70 | 250 | |
| 6 | RBEF 90/50-T | polyester film + acryl prism | ↑ | 90 | 50 | radius of curvature 12μ at apex |
| 7 | RBEF 90/50-M | ↑ | ↑ | 90 | 50 | radius of curvature 12μ at apex, low gloss processing on back surface |
| 8 | W520 | Polycarbonate | ↑ | 97 | 100 | radius of curvature 16μ at apex |
| 9 | BEF III 90/50 | polyester film + acryl prism | ↑ | 90 | 50 | pitch is random and 50 μm on average |
| 10 | IDF II-20 | ↑ | ↑ | 70 | 50 | asymmetric prism |
| 11 | Pyramid triangle | polyurethane film | pyramid-shaped prism | | 180 | pattern is triangular pyramid |
| 12 | Pyramid rectangle | ↑ | ↑ | | 100 | pattern is rectangle pyramid |
| 13 | Sn PET | polyester film + tin deposition | — | — | — | deposition layer is about 0.3 μm in thickness |
| 14 | mat PET | low gloss agent blended polyester | — | — | — | 50 μm in thickness, milky white, transparent to some degree |

TABLE 2

| Example No. | Film/ Orientation | Appearance Unlit conditions | Lit conditions |
|---|---|---|---|
| Example 1 | 1/A | amber color | light red |
| Example 2 | 2/A | amber color | light red |
| Example 3 | 3/A | amber color | light red |
| Example 4 | 4/A | amber color | light red |
| Example 5 | 5/A | amber color | light red |
| Example 6 | 6/A | amber color | light red |
| Example 7 | 7/A | amber color | light red |
| Example 8 | 8/A | amber color | light red |
| Example 9 | 9/A | amber color | light red |
| Example 10 | 10/A | amber color | light red |
| Example 11 | 11/A | amber color | light red |
| Example 12 | 12/A | amber color | light red |
| Example 13 | 1/B | a little reddish amber color | light red |
| Example 14 | 3/B | a little reddish amber color | light red |
| Example 15 | 4/B | a little reddish amber color | light red |
| Comparative example 1 | no film | red | red |
| Comparative example 2 | 13/— | metallic red | dark red |
| Comparative example 3 | 14/— | amber color | dark red |

Examples 16 to 32 and Comparative Examples 4 to 7

Nine types of polarizing film are prepared as described in Table 3 below. The polarizing films prepared in these examples are prism films of Sumitomo 3M (the trade name is described in the name column) unless otherwise specified. Every prism film has a prismatic structure (structural surface) only on one side while the other side is smooth. The structural surface is formed with fine prisms linearly and has a section in which triangles with apex angles described in Table 3 are arranged. The smooth surface of each prism film is laminated with an acrylic group pressure-sensitive adhesive 40 μm thick, after which the prism film is cut to about 100 mm in length along the direction perpendicular to the length of the prism. The prism film piece thus obtained has a width (which corresponds to "the structure portion" according to the invention) as described in Table 4.

A plurality of prism film pieces are attached, with the prism surface directed toward the light source along the horizontal length of the lamp, on the inner surface of the lamp cover (of which both surfaces are smooth) amber in color of the rear combination lamp (the lamp chamber of the turn signal lamp with the opening having the size of 12 cm wide by 9 cm tall) of a passenger car. Adjacent ones of the film pieces have an interval (which corresponds to the "non-structure portion" in this invention) as described in the column "Interval" in Table 4. In other words, as many prism film pieces as possible are attached along the height over the whole surface of the lamp cover. Each lamp cover has a striped lamp light-emitting surface in which surface portions having no film (non-structure portions) alternate with surface portions having a film (structure portions). For each of the lamp light-emitting surfaces, the transparency degree defined as the ratio of area between the non-structure portions and the structure portions is as described in Table 4. In the first comparative example, the width of the prism film piece is 9 cm and equal to the height of the opening, and the entire lamp light-emitting surface is covered with the prism film. Specifically, in the first comparative example, the transparency degree (defined as the ratio of area between the non-structure portions and the structure portions) is 0%. In the fourth comparative example, on the other hand, the prism film pieces are not attached and therefore the transparency degree is 100%.

Next, the rear combination lamp prepared in the aforementioned manner was visually evaluated based on the criteria described for the following three items A, B and C.

Evaluation Item A

Appearance of the structure itself of the lens portion or the prism portion when the lamp is lit and extinguished Criteria:

Ω . . . The structural pattern is so fine that the structure itself is not visible. The interior of the structure appears to be uniform.

γ . . . The structural pattern is rather fine, and the structure itself is substantially invisible. The interior of the structure appears to be substantially uniform.

TABLE 3

| Film No. | Film name | Structure | Surface pattern | Apex angle α (°) | Pitch p (μm) | Remarks |
|---|---|---|---|---|---|---|
| 16 | BEF11 90/50 | Polyester film and acrylic prism | Linear prism | 90 | 50 | |
| 17 | BEF11 90/24 | ↑ | ↑ | 90 | 24 | |
| 18 | BEF11 100/31 | ↑ | ↑ | 100 | 31 | |
| 19 | TRAF11 | ↑ | ↑ | 70 | 31 | |
| 20 | TRAF | Polycarbonate | ↑ | 70 | 250 | |
| 21 | W520 | Polycarbonate | ↑ | 97 | 100 | Apex rounded with radius of 16 μm |
| 22 | BEF111 90/50 | Polyester film and acrylic prism | ↑ | 90 | 50 (mean) | Pitch at random, 50 μm on average |
| 23 | IDF11-20 | ↑ | ↑ | 70 | 50 | Prism asymmetric |
| 24 | Polyurethane prism | Polyurethane | ↑ | 90 | 50 | |

θ . . . The structural pattern is somewhat rough, and the structure is visible. The interior of the structure appears to be uneven.

X . . . The structural pattern is so large that the structure itself is clearly visible. The interior of the structure appears to be uneven.

Evaluation Item B

The appearance of the light-emitting portions as a whole when the lamp is lit. Especially, observe the contrast between the illumination visible through the structure portions having lens portions or prism portions and the illumination through the other portions (non-structure portions) not having such lens or prism portions, and the feeling of depth thereof.

Criteria:

☉ . . . The light source visible through the structure portions and the light source visible through the non-structure portions appear at different positions both as sufficiently large clear double images, and the both the luminance and the image positions change with the movement of the eye point. The contrast and the feeling of depth are very high.

γ . . . The light source visible through the structure portions and the light source visible through the non-structure portions appear as images at different positions, and the both the luminance and the image position change with the movement of the eye point. The contrast and the feeling of depth are high.

θ . . . The light source visible through the structure portions and the light source visible through the non-structure portions appear as double images at different positions, and the both the luminance and the image position change with the movement of the eye point. Since the ratio of area between the structure portions and the non-structure portions is unbalanced, however, the contrast and the feeling of depth are obtained only to some degree.

θ* . . . The light source is visible as an image only through the non-structure portions, and only the luminance changes with the movement of the eye point. The contrast and the feeling of depth are obtained only to some degree.

X . . . No contrast or feeling of depth worthy of special mention.

Evaluation Items C

The appearance of the whole surface of the lamp when extinguished. Especially, observe the contrast between the surface of the structure portions having lens portions or prism portions and the part (non-structure portions) having no lens or prism portions, and the feeling of depth thereof.

Criteria:

☉ . . . The surface of the structure portions has no transparency, but the feeling of depth, in significant contrast with the transparency of the surface of the non-structure portions.

γ . . . The surface of the structure portions has no transparency, but the feeling of depth, in contrast with the transparency of the surface of the non-structure portions.

θ . . . The surface of the structure portions has no transparency in contrast with the transparency of the surface of the non-structure portions. Due to the unbalanced ratio of area between the structure portions and the non-structure portions, however, only a small degree of the feeling of depth is obtained.

θ** . . . Since the surface of the structure portions has some transparency only in small contrast with the transparency of the surface of the non-structure portions, and only a small feeling of depth is obtained.

X . . . No contrast and no feeling of depth worthy of special mention.

As the result of the series of evaluation tests, the evaluation result as described in Table 4 below was obtained.

Comparative Example 8

Although the method described in Examples 16 to 32 is repeated, this example employs, for comparison, a lamp cover having a textured pattern like a fisheye lens as described in Table 4 instead of additionally using the prism film. Specifically, this example employs the lamp cover of the rear combination lamp of the passenger car, which is so designed that portions with both sides smooth alternate in stripes with portions having the inner surface thereof formed with protrusions like fisheye lenses. The textured design is formed at the same time that the cover body is formed by the injection molding of acrylic resin. The size of each protrusion like the fisheye lens is 4 mm by 6 mm, and the transparency degree (the area ratio of the portions of the light-emitting surface having no lens) is 7.3%.

As the result of an evaluation test similar to that of the examples described above, the evaluation result described in Table 4 below was obtained.

Comparative Example 9

The method described for Comparative Example 8 above is repeated. In this example, the size of each protrusion like the fisheye lens is 5 mm by 8 mm as described in Table 4 below, and the transparency degree (the area ratio of the portions of the light-emitting surface having no lens) is 7.3%.

As the result of an evaluation test similar to that of the examples described above, the evaluation result described in Table 4 below was obtained.

Comparative Example 10

The method described for Examples 16 to 32 is repeated. In this example, the lamp cover of the turn signal lamp for the front corners is used, by way of comparison, in place of the lamp cover of the rear combination lamp of the passenger car. Also, the lamp cover having a linear prism structure, as described in Table 4 below, is used instead of additionally using the prism film. Specifically, in this example, the inner surface of the lamp cover, which is so structured that prisms each having a triangular section with the apex angle of about 90° and the pitch of about 1.5 mm are linearly arranged, has smooth portions formed by cutting the prisms by 5 mm at intervals of 10 mm along the direction perpendicular to the prism length. As a result, the external appearance of a lamp light-emitting surface is obtained, in which smooth surface portions where the interior of the lamp chamber is directly visible alternate in stripes with surface portions having the prism structure. With this lamp cover, the transparency degree (the ratio of the area having no lens on the light-emitting surface) is 50%.

As the result of conducting an evaluation test similar to that for the examples described above, the evaluation result as described in Table 4 below was obtained.

Example 33

The method described in Examples 16 to 32 is repeated. In this example, the surface of the prism film 1 described in Table 3 nearer to the surface of the structure portions is printed with a colorless, transparent UV curing clear paint (trade name "Diabeam FS-2260" of Mitsubishi Rayon) by the silk screen printing method and is cured with the UV radiator. The silk screen plate is so shaped that five ink transmitting surfaces, each 8 mm by 100 mm, are arranged at intervals of 16 mm. This silk screen plate is placed on a film in such a manner that the length of the transmitting surfaces crosses at right angles to the length of the prism structure. The cured clear paint has a larger thickness than the height (about 43 μm) of the prism structure and has a substantially smooth surface. Consequently, a prism film is obtained in which the 8-mm wide surface having the prism structure alternates in stripes with the 8-mm wide surface of the non-structure portions.

A prism film having the same structure as above is fabricated with the masking tapes (a pressure-sensitive adhesive layer combined with a backing film of paper, polyvinyl chloride or the like) each cut to the width of 8 mm and attached at intervals of 8 mm on the prism film 1. The whole surface of the film with the masking tapes attached thereto is coated with the aforementioned clear paint by the screen printing method, the bar code printing method or the spray printing method, after which the film is cured by the UV radiator and the masking tapes are separated.

The prism film thus obtained is attached on the inner surface of the lamp cover of the rear combination lamp (the lamp chamber of the turn signal lamp, having an opening 12 cm wide by 9 cm tall) of the passenger car in accordance with a method similar to that for the examples described above. The conditions for attachment are described in Table 4 below.

As the result of an evaluation test similar to that for the examples described above, the evaluation result as described in Table 4 is obtained.

Example 34

The method described for Examples 16 to 32 is repeated. In this example, a metal plate about 1 mm thick and having a size of about 110 mm by 8 mm is pressed against that surface of the prism film 6 described in Table 3 which is nearer to the structure portions, in such a position that the length of the prism structure of the film crosses at right angles to the metal plate. The metal plate is already heated to about 230 to 270° C., and a jig is used for applying the pressure. Next, the metal plate pressed against the film is cooled and separated. Since the pressed surface of the metal plate has been finished almost to a mirror surface, the prism structure of the film is flattened by being crushed under heat and formed into a smooth surface by transfer of the surface of the metal plate. By carrying out this process at intervals of about 16 mm, a film is obtained in which an 8-mm wide surface having a prism structure alternates in stripes with an 8-mm wide surface of the non-structure portions.

The prism film thus obtained is attached on the inner surface of the lamp cover of the rear combination lamp (the lamp chamber of the turn signal lamp with an opening of the size, 12 cm wide and 9 cm tall) of the passenger car in accordance with a method similar to that employed for the examples described above.

As the result of an evaluation test conducted in the same manner as in the above-mentioned examples, the evaluation result as described in Table 4 below is obtained.

Example 35

The method described for Examples 16 to 32 is repeated. In this example, a lamp cover having a linear prism structure is prepared and used in the following manner instead of additionally using the prism film for the lamp cover.

A lamp cover of acrylic resin (both surfaces smooth) for use with the rear combination lamp (the lamp chamber of the turn signal lamp having an opening of the size, 12 cm wide and 9 cm tall) of the passenger car and a metal plate about 1 mm thick and having a size of about 110 mm by 8 mm bent into a shape along the inner surface of the lamp cover are prepared. The metal plate heated to about 200 to 250° C. is pressed against the inner surface of the lamp cover using an appropriate jig. The surface of the metal plate pressed into contact with the inner surface of the lamp cover has been so structured that fine prisms having triangular sections about 90° in apex angle and about 50 μm in pitch are arranged linearly in the direction perpendicular to the length of the metal plate. As the result of this pressure application, the fine surface structure of the metal plate is transferred to the inner surface of the cover. By applying this process at intervals of about 16 mm, a lamp cover is obtained in which that surface of the light-emitting surface which has a prism structure alternates in strips with a surface through which the interior of the lamp chamber is visible.

The lamp cover thus obtained is mounted on the rear combination lamp of the passenger car, and an evaluation test similar to that for the examples described above is conducted. The evaluation result as described in Table 4 below is obtained.

TABLE 4

| Example No. | Film used | | Transparency degree (%) | Film (lens portion) width (mm) | Interval (mm) | Appearance evaluation | | |
|---|---|---|---|---|---|---|---|---|
| | Film No. | Lens pitch (mm) | | | | A | B | C |
| Comparative example 4 | 1 | 0.05 | 0 | 90 (attached on whole surface) | — | ○ | X | X |
| Comparative example 5 | ↑ | ↑ | 2.5 | 19.5 | 0.5 | ○ | X | θ |
| Example 16 | ↑ | ↑ | 5 | 19 | 1 | ○ | θ | ϒ |
| Example 17 | ↑ | ↑ | 10 | 18 | 2 | ○ | ϒ | ○ |
| Example 18 | ↑ | ↑ | 20 | 10 | 2.5 | ○ | ○ | ○ |

TABLE 4-continued

| Example No. | Film used Film No. | Lens pitch (mm) | Transparency degree (%) | Film (lens portion) width (mm) | Interval (mm) | Appearance evaluation A | B | C |
|---|---|---|---|---|---|---|---|---|
| Example 19 | ↑ | ↑ | 30 | 10 | 4.3 | ○ | ○ | ○ |
| Example 20 | ↑ | ↑ | 50 | 5 | 5 | ○ | ○ | ○ |
| Example 21 | ↑ | ↑ | 70 | 3 | 7 | ○ | ○ | ○ |
| Example 22 | ↑ | ↑ | 80 | 3 | 12 | ○ | Δ | ○ |
| Example 23 | ↑ | ↑ | 85 | 3 | 17 | ○ | Δ | ○ |
| Example 24 | ↑ | ↑ | 90 | 2 | 18 | ○ | θ | Δ |
| Comparative example 6 | ↑ | ↑ | 95 | 2 | 38 | ○ | θ | θ |
| Comparative example 7 | Nil | — | 100 | — | — | — | X | X |
| Example 25 | 2 | 0.024 | 50 | 5 | 5 | ○ | ○ | ○ |
| Example 26 | 3 | 0.031 | 50 | 5 | 5 | ○ | ○ | ○ |
| Example 27 | 4 | 0.031 | 50 | 5 | 5 | ○ | ○ | ○ |
| Example 28 | 5 | 0.25 | 50 | 5 | 5 | Δ | ○ | ○ |
| Example 29 | 6 | 0.1 | 50 | 5 | 5 | ○ | ○ | ○ |
| Example 30 | 7 | 0.05 on average | 50 | 5 | 5 | ○ | ○ | ○ |
| Example 31 | 8 | 0.05 | 50 | 5 | 5 | ○ | ○ | ○ |
| Example 32 | 9 | 0.05 | 50 | 5 | 5 | ○ | ○ | ○ |
| Comparative example 8 | Fisheye lens or the like | 4 | 73 | 6 | 16 | X | θ* | θ** |
| Comparative example 9 | Fisheye lens or the like | 5 | 73 | 8 | 22 | X | θ* | θ** |
| Comparative example 10 | Linear prism | 1.5 | 50 | 5 | 5 | X | ○ | θ** |
| Example 33 | Linear prism | 0.05 | 50 | 8 | 8 | ○ | ○ | ○ |
| Example 34 | Linear prism | 0.1 | 50 | 8 | 8 | ○ | ○ | ○ |
| Example 35 | Linear prism | 0.05 | 50 | 8 | 8 | ○ | ○ | ○ |

The evaluation result described in Table 4 above shows that the appearance obtained in Comparative Examples 4 to 10 is unsatisfactory, while an appearance design quality having a superior feeling of depth can be obtained without recognizing the textured structure as an eyesore in Examples 16 to 35 comprising a selective polarizing layer formed on the inner surface of the lamp cover according to the invention.

As has been described before, by using the automotive lamp of the present invention, in addition to satisfactory function as a lamp under lighting conditions, harmonized and uniform appearance with body and its color, windows and parts, can be achieved under unlit conditions. Thus, if the automotive lamp of the present invention is used as a rear combination lamp, under unlit conditions, the lamp cover for the stop and tail lamp is amber color, and when the light source is lighted, the lamp cover can be lighted in red color. The automotive lamp of the present invention is relatively simple in construction and easy to be manufactured at low cost.

Also as described above, according to this invention, there is provided an automotive lamp in which the function of the lamp can be fully exhibited, and also the appearance design quality that has never been achieved in the past can be attained. Further, the surface appearance uniform and high in quality can be observed with the feeling of depth emphasized when the lamp is extinguished.

Also, according to this invention, the lamp according to the invention can be completed simply by adding a simplistic improvement to the existing lamp, and if required, many appearance variations can be easily realized.

The invention claimed is:

1. A vehicle lamp comprising:
   a lamp chamber containing at least one light source in an interior thereof and having a light-emitting opening;
   a lamp cover attached to said light-emitting opening, said lamp cover comprising a transparent cover body having a configuration and size capable of covering at least a light emission surface of said lamp; and
   a polarizing film applied to an inner surface of said cover body, said polarizing film having fine textured structures on a surface thereof for changing color of the exterior of said lamp when the light source is in a lit condition compared to an unlit condition, wherein said fine textured structures includes prisms having a pitch p of not more than 1 mm and an apex angle α of said prisms is not more than 150°.

2. A vehicle lamp according to claim 1, wherein said textured structures are fine textured structures exhibiting special optical characteristics such that the exterior of said lamp changes color when the light source is in a lit condition compared to an unlit condition.

3. A vehicle lamp according to claim 1, wherein said textured structures are fine prisms and said polarizing film is a prism sheet such as that useful in a back light for a liquid crystal display panel.

4. A vehicle lamp according to claim 1, wherein said lamp further comprises a cover color such that light from said light source acquires a predetermined functional color when emitted through said lamp cover out of said lamp chamber, and the functional color and the cover color are different from each other.

5. A vehicle lamp according to claim 1, wherein said lamp further comprises a cover color, and said polarizing film is a prism sheet that prevents the recognition of the color of the light source under unlit conditions so that only the cover color can be seen under unlit conditions and a color difference can be seen under lit conditions.

6. A vehicle lamp according to claim 1, wherein said polarizing film transmits P polarized heht and reflects S polarized light, and the reflected S polarzed light is transmitted through said polarizing film after the polarization is removed from the light upon its multiple reflection.

7. A vehicle lamp according to claim 1, wherein said polarizing film is a prismatic-structured film and said fine textured structures are prismatic structures.

8. A vehicle lamp according to claim 1, wherein said polarizing film is a luminance increasing film.

9. A vehicle lamp according to claim 1, wherein said vehicle lamp further comprises a filter element between said light source and said lamp cover.

10. A vehicle lamp according to claim 1, wherein the color of said cover body and the color of the light outwardly emitted through said polarizing film from said light source are different.

11. A vehicle lamp according to claim 1, wherein said vehicle lamp is a separated chamber type lamp structure comprising at least two lamp chambers each having a light source, and the color of at least one lamp chamber is different under lit and unlit conditions.

12. A vehicle lamp according to claim 11, wherein said vehicle lamp is used as a rear combination lamp of at least two lamps, from the group consisting of a brake lamp, a tail lamp, a brake and tail lamp, a turn-signal lamp and a back-up lamp, are contained in an opitonal pattern and combination, with the color of one of said lamps being different than the color of another of said lamps under lit conditions.

13. A vehicle lamp according to claim 12, wherein said lamp includes a turn-signal lamp and a brake lamp, said turn signal lamp is the same color under lit and unlit conditions, and said brake lamp is a different color under lit and unlit conditions, with the color of said brake lamp being different than the color of said turn-signal lamp under lit conditions.

14. A vehicle lamp according to claim 13, wherein the color of said brake lamp is the same as the color of said turn-signal lamp under unlit conditions.

15. A vehicle lamp according to claim 1, wherein said polarizing film is a single polarizing layer.

16. A vehicle lamp according, to claim 15, said single polarizing layer isa single selective polarizion layer.

17. A vehicle lamp according to claim 16, wherein single selective polarizing layer is formed, in a predetermined pattern, with structure portions of a finely textured structural surface and non-structure portions not having such a textured structural surface.

18. A vehicle lamp according to claim 17, wherein the inner surface of said lamp cover is formed with said selective polarizing layer by processing the patterns of said structure portions and said non-structure portions.

19. A vehicle, lamp according to claim 17, wherein the transparency degree, defined as an area ratio between said structure portions and said non-structure potions, of said selective polarizing layer is the range of 5 to 90%.

20. A vehicle lamp according to claim 17, wherein said structure portions or said non-structure portions of said selective polarizing layer are formed of a pattern of selected one of stripes, grids, dots and a combination thereof.

21. A vehicle lamp according to claim 1, wherein said lamp cover is colored.

22. A vehicle lamp according to claim 1, wherein said lamp cover has the function of a lens.

23. A vehicle lamp according to claim 1, wherein said textured structures are located on only one surface of said polarizing film.

24. A vehicle lamp according to claim 1, wherein said textured structures are located on only one surface of said polarizing film, which is facing toward said light source.

25. A vehicle lamp according to claim 1, wherein said textured structures are located on only one surface of said polarizing film, which is facing toward said lamp cover.

26. A vehicle lamp according to claim 1, wherein said textured structures are prism structures located on only one surface of said polarizing film.

* * * * *

UNITED STATES PATENT AND TRADEMARK OFFICE
CERTIFICATE OF CORRECTION

PATENT NO. : 7,137,718 B2
APPLICATION NO. : 10/492661
DATED : November 21, 2006
INVENTOR(S) : Ken Egashira It is certified that error appears in the above-identified patent and that said Letters Patent is hereby corrected as shown below:

Column Title Page Col. 2 (U.S. Patent Documents) – Line 11- After "6,906,863" delete "B1" and insert -- B2 --, therefor.

Column 25 – Line 8 - In Claim 6, delete "heht" and insert -- light --, therefor.

Column 25 – Line 9 - In Claim 6, after "S" delete "polarzed" and insert -- polarized --, therefor.

Column 25 – Line 33 - In Claim 12, delete "opitonal" and insert -- optional --, therefor.

Column 26 – Line 3 - In Claim 16, after "according" delete ",".

Column 26 – Line 4 (Approx.) - In Claim 16, delete "isa" and insert -- is a --, therefor.

Column 26 – Line 4 (Approx.) - In Claim 16, delete "polarizion" and insert -- polarizing --, therefor.

Column 26 – Line 16 - In Claim 19, after "vehicle" delete ",".

Column 26 – Line 18 (Approx.) - In Claim 19, delete "potions," and insert -- portions, --, therefor.

Column 26 – Line 19 (Approx.) - In Claim 19, after "layer is" insert -- in --.

Signed and Sealed this

Third Day of April, 2007

JON W. DUDAS
*Director of the United States Patent and Trademark Office*